(12) United States Patent
Bernard

(10) Patent No.: US 6,360,946 B1
(45) Date of Patent: Mar. 26, 2002

(54) VANDAL PROOF ELECTRONIC MEMORY CARD READER

(75) Inventor: Alain Bernard, Joinviile-le-Pont (FR)

(73) Assignee: Schlumberger Systemes, Montrouge (FR)

( * ) Notice: Subject to any disclaimer, the term of this patent is extended or adjusted under 35 U.S.C. 154(b) by 0 days.

(21) Appl. No.: 09/601,399

(22) PCT Filed: Jan. 12, 1999

(86) PCT No.: PCT/FR00/00042

§ 371 Date: Aug. 2, 2000

§ 102(e) Date: Aug. 2, 2000

(87) PCT Pub. No.: WO99/40534

PCT Pub. Date: Aug. 12, 1999

(30) Foreign Application Priority Data

Feb. 9, 1998 (FR) .............................................. 98 01485

(51) Int. Cl.[7] .................................................. G06A 7/06
(52) U.S. Cl. ...................................... 235/441; 235/482
(58) Field of Search ................................. 235/482, 441

(56) References Cited

U.S. PATENT DOCUMENTS

| | | | | |
|---|---|---|---|---|
| 4,724,310 A | * | 2/1988 | Shimamura et al. | 235/482 |
| 4,839,509 A | * | 6/1989 | Yasuma et al. | 235/482 |
| 5,202,551 A | * | 4/1993 | Parrer | 235/441 |
| 5,225,653 A | * | 7/1993 | Martin et al. | 235/485 |
| 5,508,501 A | * | 4/1996 | Fujimoto et al. | 235/483 |

FOREIGN PATENT DOCUMENTS

| | | |
|---|---|---|
| EP | 0 348 929 A1 | 1/1990 |
| EP | 0 727 758 A1 | 8/1996 |
| GB | 2 308 213 A | 6/1997 |

\* cited by examiner

*Primary Examiner*—Harold I. Pitts
(74) *Attorney, Agent, or Firm*—Frishauf, Holtz, Goodman, Langer & Chick, P.C.

(57) ABSTRACT

An electronic memory card reader (10) for reading a card comprising a card body (11) and electrical contact areas (12). The reader includes a read head (100) having connection elements (112) designed to cooperate with the contact areas (12), an insertion slot (200), an abutment (300) for the card body, defining a processing position in which the areas (12) are in contact with the connection elements (112), and a moving part (400) that is rotatable, and that is capable, firstly, in a closed position, of establishing electrical contact between the elements (112) and the areas (12) in the processing position and, secondly, of moving away from the closed position under the action of a force developed by the card (10) moving in translation. The part (400) is returned to the closed position by resilient return means (600).

17 Claims, 2 Drawing Sheets

VANDAL PROOF ELECTRONIC MEMORY CARD READER

FIELD OF THE INVENTION

The present invention relates to an electronic memory card reader.

BACKGROUND OF THE INVENTION

In the description below, "reader" refers to a device that is capable not only of reading, but possibly also of writing data in the memory of said electronic memory card.

Electronic memory cards are now well known. Such cards are essentially composed of a card body of generally rectangular shape in which an electronic module is implanted. The electronic module comprises an integrated circuit including at least a memory circuit and electrical contact areas disposed on one face of the card body and connected to the terminals of the integrated circuit. To use such a card, said card is inserted in a processor machine. The processor machine comprises processing circuits to make use of the data contained in the memory of the card and to modify said data, and a reader which enables a temporary electrical connection to be established between the contact areas of the card and the processing circuits of the machine. Establishing said connection serves to power the integrated circuit of the card, to transmit read/write instructions for the memory of the card, to apply a write voltage, a clock signal, etc . . .

A reader normally comprises a housing which, on its front face, includes a card insertion slot, and which inwardly defines a guide channel serving to position the card so that when said card is in the processing position, i.e. in the inserted position, the contact areas of the card are in electrical contact with the connection elements of a read head containing said processing circuits. With regard to memory cards in accordance with the ISO standard, the contact areas are disposed close to one corner of the card body. The connector of the reader is thus off-center relative to its mid-plane.

Several types of reader exist. In some of them, only part of the card penetrates into the guide channel when it is brought into the processing position, the card being displaced either manually by the user or by a motor-driven wheel. The reader is thus referred to as a "non-swallowing" reader. In other readers, the entire card penetrates into the guide channel in order to reach the processing position, the displacement of the card in both directions being obtained by a drive motor. Such a card reader is described in European patent application 0 139 593, filed in the name of FLONIC. The second type of reader, referred to as a "swallowing" reader, ensures that the card cannot be moved by the holder of the card while said card is being processed. However, if the displacement means for displacing the card fail, then the card remains blocked in the guide channel which is inconvenient for the cardholder and for the company managing the reader since said reader cannot be used until it has been repaired. Furthermore, many users do not like to see their cards swallowed completely by a reader.

In the second type of reader, that risk and fear does not exist since a portion of the card body always projects outside the card reader. However, both types of reader can be the subject of malicious acts seeking to prevent them from operating. One of the most frequent acts consists in inserting a portion of a good card body in the guide channel of the reader, but the body has been cut so that its length is slightly shorter than the length of the guide channel in the case of a reader of the first type, and slightly shorter than the stroke of the card in the case of a reader of the second type. In both cases, users arriving after the malicious act has been performed cannot use the reader since the portion of card body constituting what is referred to as a "bad card" cannot be extracted from the guide channel. This requires the intervention of a maintenance team and prevents the reader from operating for a significant period of time.

OBJECTS AND SUMMARY OF THE INVENTION

Thus, one object of the present invention is to provide an electronic memory card reader for reading a card comprising a card body and electrical contact areas disposed on one face of said card body, said reader enabling the above-mentioned acts of vandalism to be prevented or at least made more difficult.

This and other objects are attained in accordance with one aspect of the invention directed to a reader comprising a read head having connection elements designed to enter into electrical contact with the contact areas of the electronic memory card, the connection elements defining a "reference plane." An insertion slot is situated in the reference plane. A guide means guides the card in translation along the reference plane. An abutment for the card body defines, at the end of insertion, a processing position for processing the card in which the electrical contact areas of the card are capable of entering into contact with the connection elements of the read head. A moving part is rotatable about an axis substantially perpendicular to the translation direction. The moving part is capable, firstly, in a "closed" position, of establishing electrical contact between the connection elements of the read head and the contact areas of the card in the processing position, by presser means for pressing the card against the read head and, secondly, of moving away from the closed position under the action of a force developed in opposition to the presser means by the card moving in translation. The moving part is returned to the closed position by resilient return means.

As can be seen in detail below, the reader of the invention enables the various types of vandalism involving the insertion of bad cards to be remedied. Bad cards which are too short fall into the bottom of the reader before reaching the moving part in the closed position. Longer bad cards which can be received by the moving part are ejected under the action of a subsequently inserted good card.

BRIEF DESCRIPTION OF THE DRAWINGS

The invention and how it can be implemented will be better understood from the following description and from the accompanying drawings given by way of non-limiting examples.

DETAILED DESCRIPTION OF THE DRAWINGS

Figure 1:
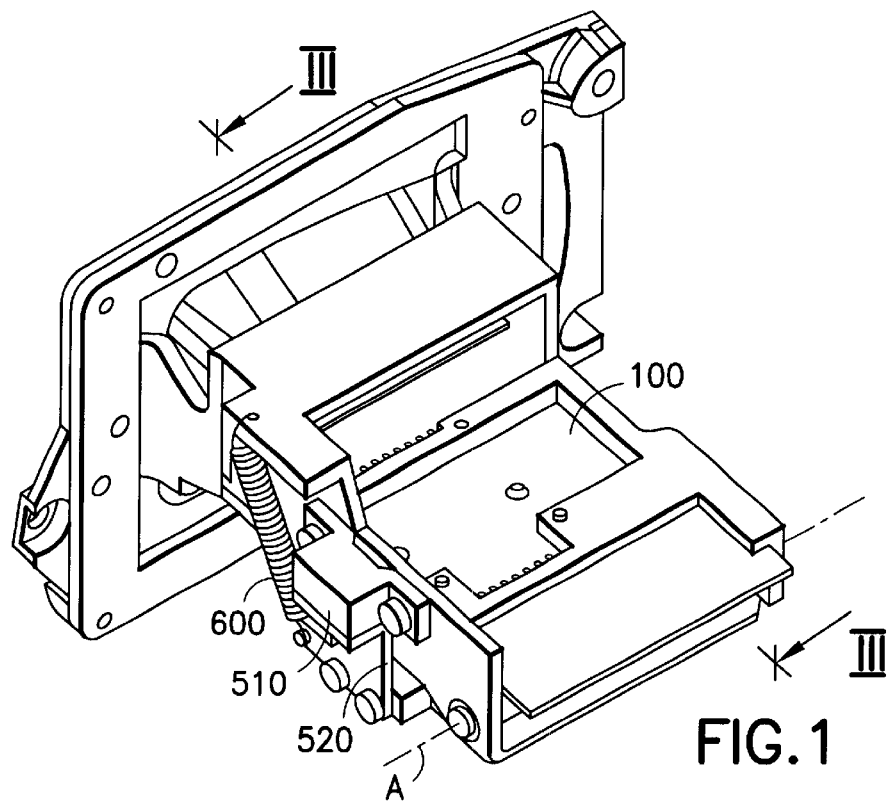
FIG. 1 is a perspective view from above of an electronic memory card reader of the invention.
Figure 2:
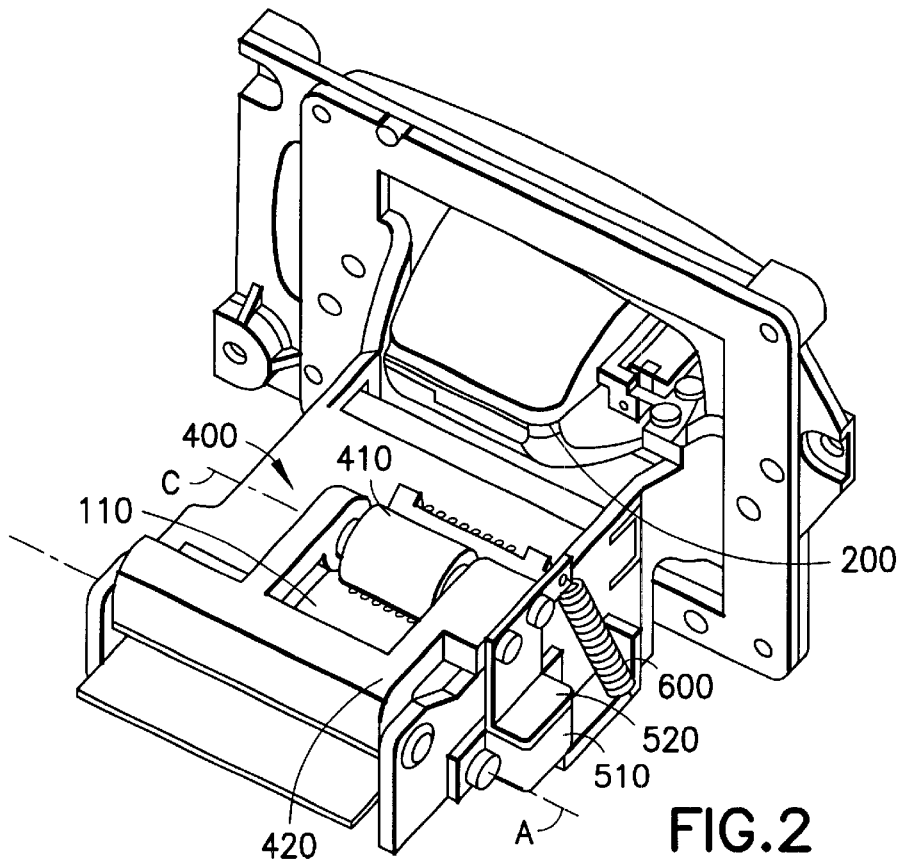
FIG. 2 is a perspective view from below of the reader of FIG. 1.
Figure 3:
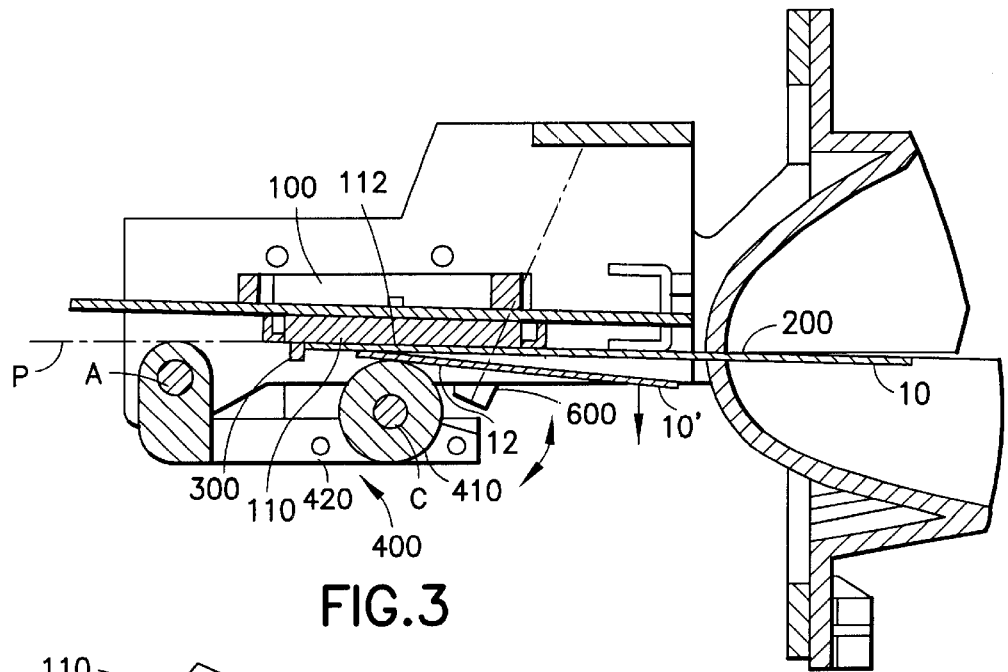
FIG. 3 is a side view in section on line III—III of FIG. 1 of the reader of FIGS. 1 and 2.
Figure 5:
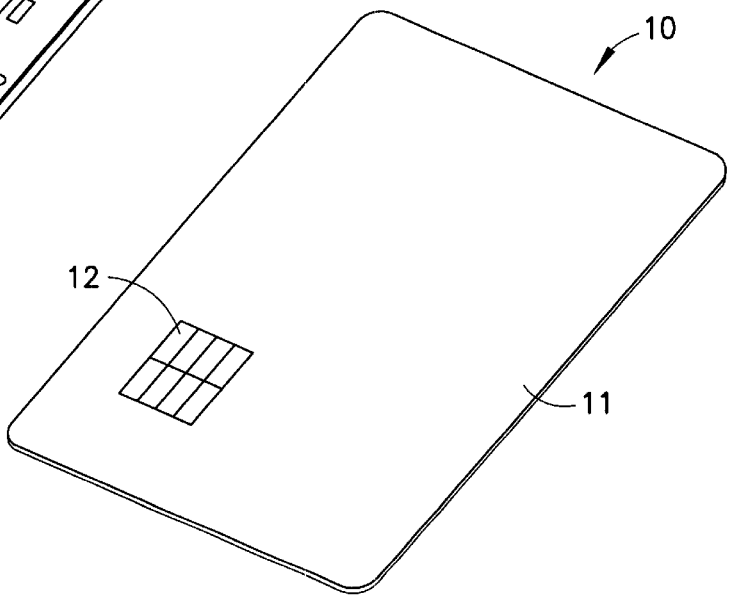
FIG. 5 is a perspective view of an electronic memory card designed to be inserted in the reader of FIGS. 1, 2, and 3.

FIGS. 1, 2, and 3 show a card reader designed to read and/or write data on an electronic memory card, e.g. a telephone card for a public telephone. As shown in FIG. 5, said electronic memory card 10 comprises a card body 11 made of plastics material, and contact areas 12 disposed on one face of said card body 11. The contact areas 12 are electrically connected to an integrated circuit, or chip, embedded in the card body 11 and containing at least a memory circuit.

Figure 4:
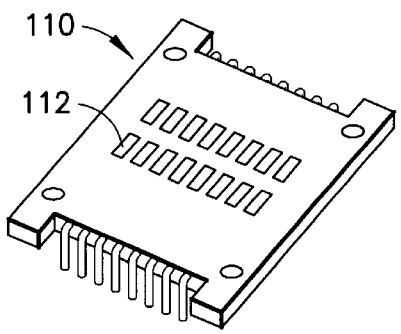
FIG. 4 is a perspective view of a connector for a read head of the reader of FIGS. 1, 2, and 3.

The reader itself includes a read head 100 having the function of exchanging data in read and/or write mode with the memory circuit of the card 10. To this end, said read head 100 comprises a connector 110 having connection elements 112 designed to enter into electrical contact with the contact areas 12 of the card 10. It is noted that, in FIG. 4, the connector 110 of the read head 100 includes two groups of eight connection elements 112 so as to enable all types of electronic memory card to be read, given that the contact areas 12 can be situated in two different adjacent locations on the card body 11. In FIG. 3, it can be seen that the connection elements 112 define a "reference plane" P.

In addition, said electronic memory card reader comprises an insertion slot 200 positioned in the reference plane P, through which the user slides the card 10 until, by means of guide means for guiding said card 10 in translation along the reference plane P, the card 10 reaches an abutment 300 for the card body 11, which defines, at the end of insertion, a processing position in which the electrical contact areas 12 of the card are capable of entering into contact with the connection elements 112 of the read head 100.

In the embodiment shown in FIGS. 1, 2, and 3, said guide means are constituted by the fact that the insertion slot is stepped in the reference plane P, substantially forming a U-shape, for example, in said reference plane.

When the card 10 arrives in the processing position, it is received by a part 400 that is rotatable about an axis A substantially perpendicular to the translation direction corresponding to insertion of the card 10. In the example in FIGS. 1, 2, and 3, said part 400 is constituted by a bracket 420 pivotable about the axis A and carrying a roller 410 that is rotably mounted about its own axis C.

When the moving part 400 is in the closed position, as shown in FIG. 3, the roller 410, then situated in the zone of electrical contact between the card 10 and the read head 100, ensures that electrical contact is made between the connection elements 112 and the areas 12 by presser means for pressing the card 10 against the read head 100. In the case shown in FIGS. 1, 2, and 3, said presser means are constituted by magnetic attraction means composed of a magnet 510 secured to the reader, and a pole piece 520 fixed on the bracket 420 and thus secured to the roller 410 of the moving part 400. It will be understood that the magnetic attraction of the magnet 510 on the pole piece 520 holds the roller 410 in the closed position, thereby pressing the card 10 against the read head 100 and thus favoring electrical contact between the connection elements 112 and the contact areas 12.

It can be seen more particularly in FIG. 3 that the reader of the invention is such that for an act of vandalism consisting in inserting a bad card having a length that is substantially shorter than the distance between the insertion slot 200 and the moving part 400 in the closed position, said bad card will fall to the bottom of the reader under the effect of its own weight since it will have completely left the insertion slot 200 before being received by the roller 410 of said moving part in the closed position. In this case, the act of vandalism has no adverse effect on use of the reader.

For a bad card having a length that is longer than the distance between the insertion slot 200 and the moving part 400 in the closed position, and naturally not projecting from the insertion slot since such a card would thus be accessible and could be removed harmlessly by the next user, said bad card 10' can reach the processing position or can at least be pressed against the read head by said presser means 510, 520 while not projecting from the insertion slot 200 as shown in FIG. 3. In this position, the bad card 10' cannot be disengaged manually and constitutes a real obstacle the next time a good card 10 is to be inserted. Nevertheless, the reader of the invention enables said situation to be remedied. Because said bad card 10' is canterlevered out, being held at one of its ends only, under the effect of its own weight, it makes an angle with the reference plane P that is directed towards the bottom of the reader, thereby having the effect whereby the next good card 10 to be inserted is inserted along the reference plane P, and therefore on top of the bad card 10' and can thus, in any event, reach the processing position despite the presence of the bad card 10'. The insertion of the good card 10 on top of a bad card 10' can be made easier still if said reference plane has a slope that rises in the insertion direction, as shown in FIG. 3.

Furthermore, the good card 10 can then develop a force tending to move the moving part 400 away from its closed position by opposing the presser means 510, 520 for pressing the roller 410 of the moving part 400 against the read head (100). This force can come from the excessive thickness that results from superposing the two cards 10, 10', and from the curvature that can affect the good card 10 arriving against the abutment 300 under the bending effect resulting from the insertion force exerted by the user. At this moment, the magnetic attraction means 510, 520 give way, leaving the roller 410 of the moving piece 400 to move away from its closed position and the bad card 10' to fall into the bottom of the reader until a return spring 600, put in traction in the opening movement of the bracket 420 of the moving part, returns said moving part 400 into its closed position, the magnetic attraction means 510, 520 again exerting their action of pressing the moving part against the read head 100.

What is claimed is:

1. An electronic memory card reader for reading a card comprising a card body (11) and electrical contact areas (12) disposed on one face of said card body (11), said reader comprising:

a read head (100) having connection elements (112) adapted to enter into electrical contact with said contact areas (12) of the electronic memory card (10), said connection elements (112) defining a "reference plane" (P);

an insertion slot (200) situated in said reference plane (P);

guide means for guiding said card (10) in translation along the reference plane (P) in a translation direction;

an abutment (300) for engaging the card body and defining, at the end of said translation, a processing position for processing the card (10) in which the electrical contact areas (12) of the card are adapted to come into contact with the connection elements (112) of the read head (100);

a moving part (400) that is rotatable about an axis (A) substantially perpendicular to the translation direction, and which is normally in a closed position adjacent said read head, and a closure means, wherein said moving part is adapted to (i) establish electrical contact between the connection elements of the read head (100) and the contact areas of the card (10) in the processing position in accordance with a closing force applied by said closure means for pressing the card (10) against the read head (100), and (ii) move away from said closed position under the action of a force developed in opposition to said closing force by the card (10) moving in said translation direction into position between said moving part and said read head.

2. A reader according to claim 1, wherein said closure means comprise magnetic attraction means (510, 520).

3. A reader according to claim 1, wherein said closure means comprise a return spring (600).

4. A reader according to claim 1, wherein said reference plane (P) has a slope that rises in the translation direction.

5. A reader according to claim 1, wherein said guide means comprise an insertion slot (200) that is stepped in the reference plane (P).

6. A reader according to claim 2, wherein said closure means further comprise a return spring (600).

7. A reader according to claim 2, wherein said reference plane (P) has a slope that rises in the translation direction.

8. A reader according to claim 3, wherein said reference plane (P) has a slope that rises in the translation direction.

9. A reader according to claim 2, wherein said guide means are constituted by an insertion slot (200) that is stepped in the reference plane (P).

10. A reader according to claim 3, wherein said guide means comprise an insertion slot (200) that is stepped in the reference plane (P).

11. A reader according to claim 4, wherein said guide means comprise an insertion slot (200) that is stepped in the reference plane (P).

12. An electronic memory card reader for reading a card comprising a card body (11) and electrical contact areas (12) disposed on one face of said card body (11), said reader comprising:

a read head (100) having connection elements (112) adapted to enter into electrical contact with said contact areas (12) of the electronic memory card (10), said connection elements (112) defining a "reference plane" (P);

an insertion slot (200) situated in said reference plane (P);

guide means for guiding said card (10) in translation along the reference plane (P) in a translation direction;

an abutment (300) for engaging the card body and defining, at the end of said translation, a processing position for processing the card (10) in which the electrical contact areas (12) of the card are adapted to come into contact with the connection elements (112) of the read head (100);

a closure means for applying a closing force;

a moving part (400) that is rotatable about an axis (A) substantially perpendicular to the translation direction and adapted to establish electrical contact between the connection elements of the read head (100) and the contact areas of the card (10) in the processing position by pressing the card (10) against the read head (100) in accordance with said closing force applied by said closure means;

wherein said moving part is adapted to engage said card to apply a force related to said closing force along a line substantially transverse to said translation direction and located adjacent to said abutment; and wherein said guide means provides lateral guidance to maintain translation of the card along said translation direction, but does not hinder movement of the card in a downward direction under influence of gravity, such that a card fully inserted into said reader is not vertically supported in a span extending between an exit point of the card from said insertion slot and engagement of the card by said moving part along said transverse line.

13. A reader according to claim 12, wherein said closure means comprise magnetic attraction means (510, 520).

14. A reader according to claim 12, wherein said closure means comprise a return spring (600).

15. A reader according to claim 12, wherein said reference plane (P) has a slope that rises in the translation direction.

16. A reader according to claim 12, wherein said guide means comprise an insertion slot (200) that is stepped in the reference plane (P).

17. A reader according to claim 13, wherein said closure means further comprise a return spring (600).

* * * * *